United States Patent
Moteki et al.

(10) Patent No.: US 6,243,645 B1
(45) Date of Patent: Jun. 5, 2001

(54) AUDIO-VIDEO OUTPUT DEVICE AND CAR NAVIGATION SYSTEM

(75) Inventors: Hiroyuki Moteki, Siojiri; Mamoru Kobayashi, Matsumoto, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/101,267

(22) PCT Filed: Nov. 4, 1997

(86) PCT No.: PCT/JP97/04014

§ 371 Date: Jun. 30, 1998

§ 102(e) Date: Jun. 30, 1998

(87) PCT Pub. No.: WO98/20303

PCT Pub. Date: May 14, 1998

(51) Int. Cl.[7] .................................................. G01C 21/00
(52) U.S. Cl. .................. 701/211; 701/212; 340/988; 340/990; 340/995; 348/564; 348/565
(58) Field of Search .................................. 701/211, 208, 701/212; 340/988, 990, 995; 348/564, 565, 566; 73/178 R

(56) References Cited

U.S. PATENT DOCUMENTS 5,680,177 * 10/1997 Abe ....................................... 348/564
6,006,161 * 12/1999 Katou ................................... 701/212

FOREIGN PATENT DOCUMENTS

| | | |
|---|---|---|
| 1-019500 | 1/1989 | (JP) . |
| 4-319985 | 11/1992 | (JP) . |
| 7-4981 | 10/1995 | (JP) . |
| 9-257499 | 3/1997 | (JP) . |
| 9-123848 | 5/1997 | (JP) . |
| 9-126803 | 5/1997 | (JP) . |

* cited by examiner

Primary Examiner—William A. Cuchlinski, Jr.
Assistant Examiner—Arthur D. Donnelly

(57) ABSTRACT

To provide an audio-video output device that can simultaneously output video and audio information from multiple input sources and which can constantly display the video or audio information from one of these sources. Input-side selector 55 which can select car navigation video information 2a, TV video information 3a, or video information 4a from a video player, and output-side selectors 56 which supplies the output from said input-side selector 55 and car navigation video information 2a as video display signals to liquid crystal panel 11 which can be split for display, are provided. Consequently, car navigation video information 2a is always displayed on panel 11 even when it is split for display. For audio information, monitoring speaker 19 through which car navigation audio information 2b can be output is provided, in addition to terminal 37 through which the audio for the video being displayed on panel 11 can be output as FM sound. Consequently, car navigation audio information 2b can be monitored regardless of the type of video information being displayed.

29 Claims, 7 Drawing Sheets

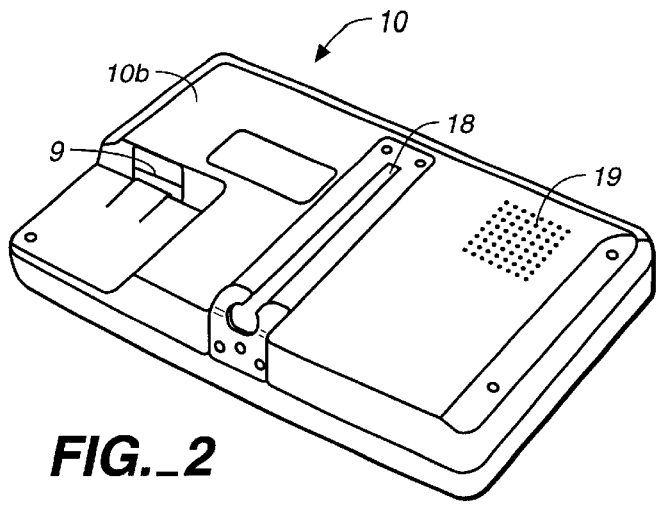
FIG._2
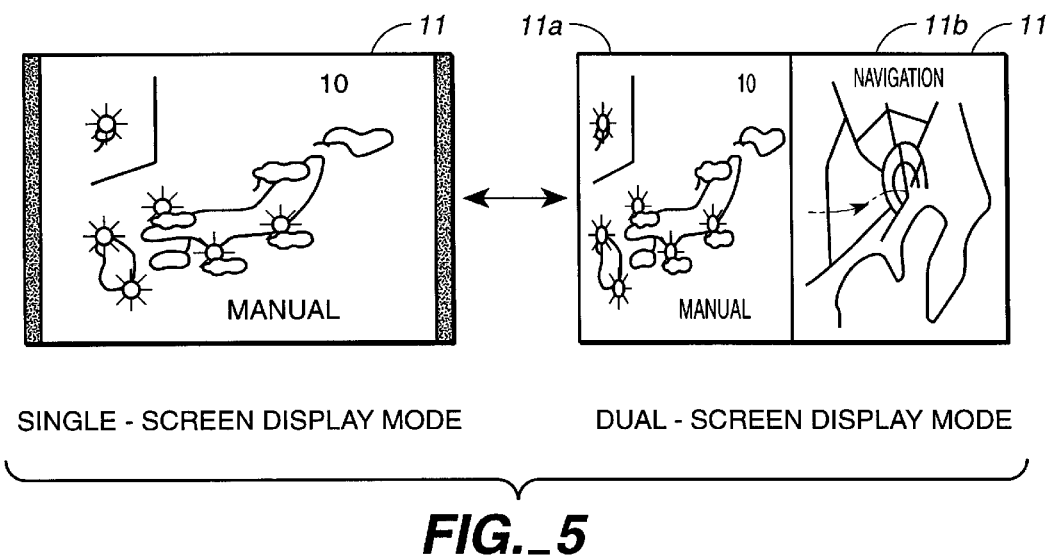
SINGLE - SCREEN DISPLAY MODE   DUAL - SCREEN DISPLAY MODE
FIG._5

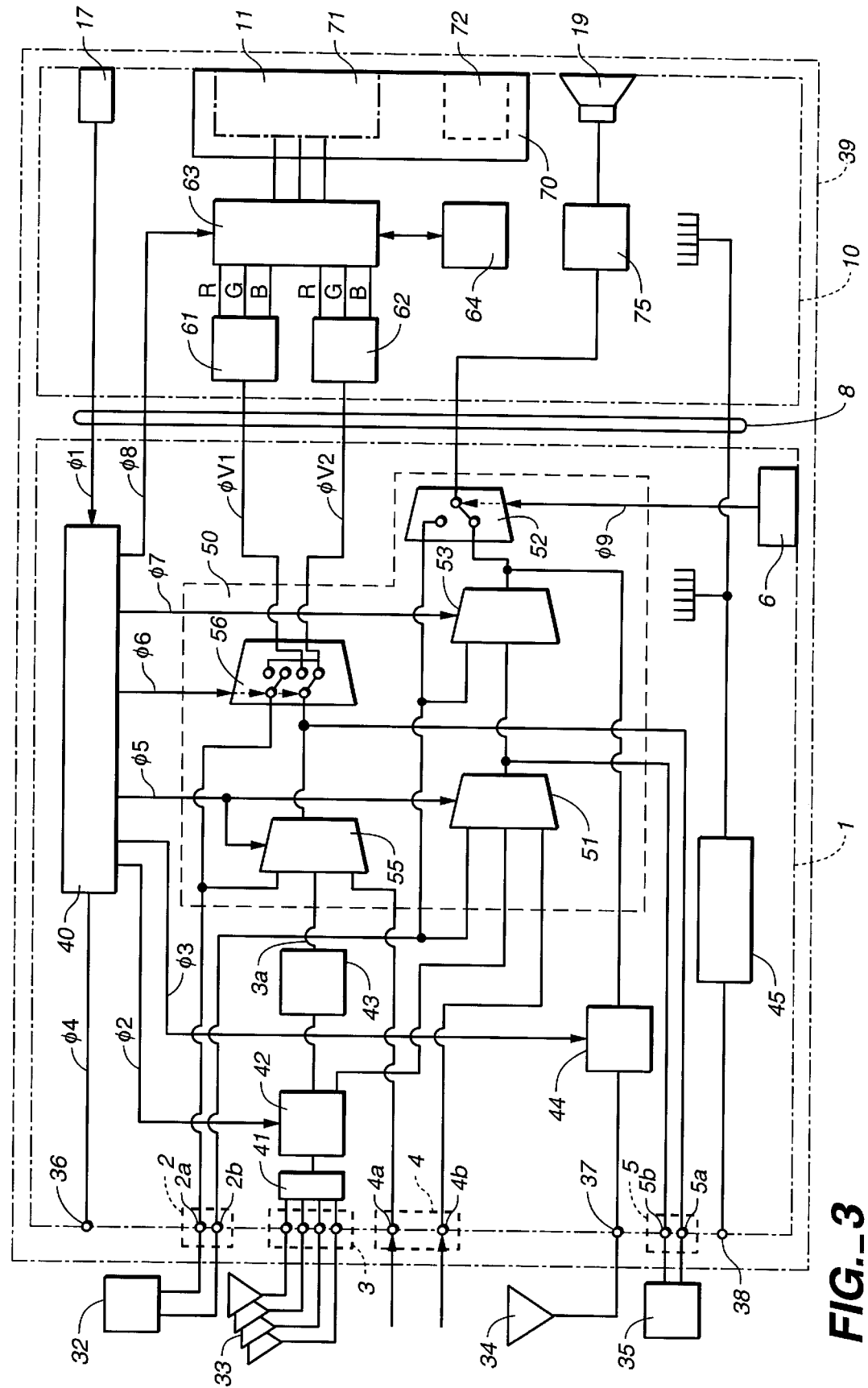
FIG._3

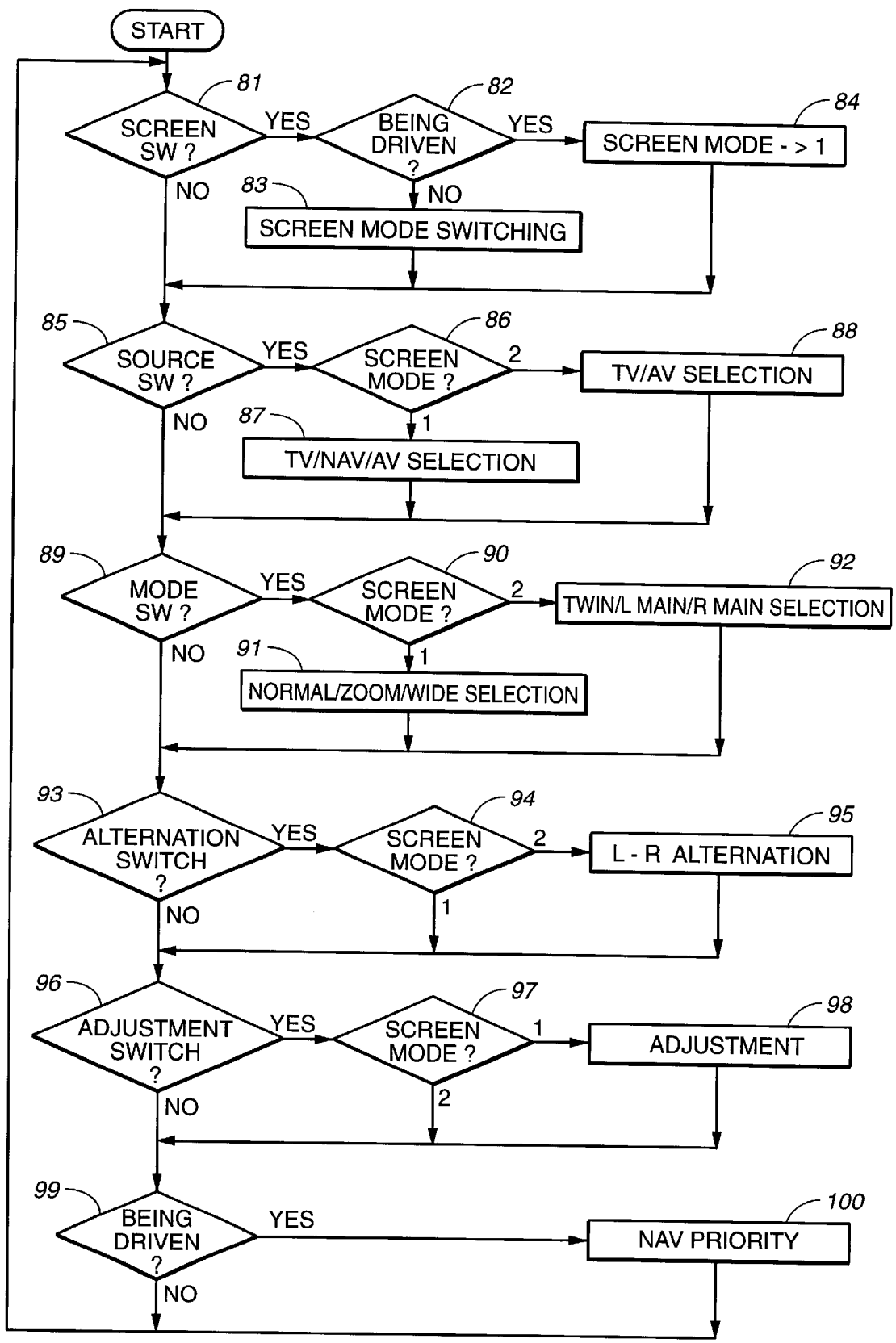
FIG._4

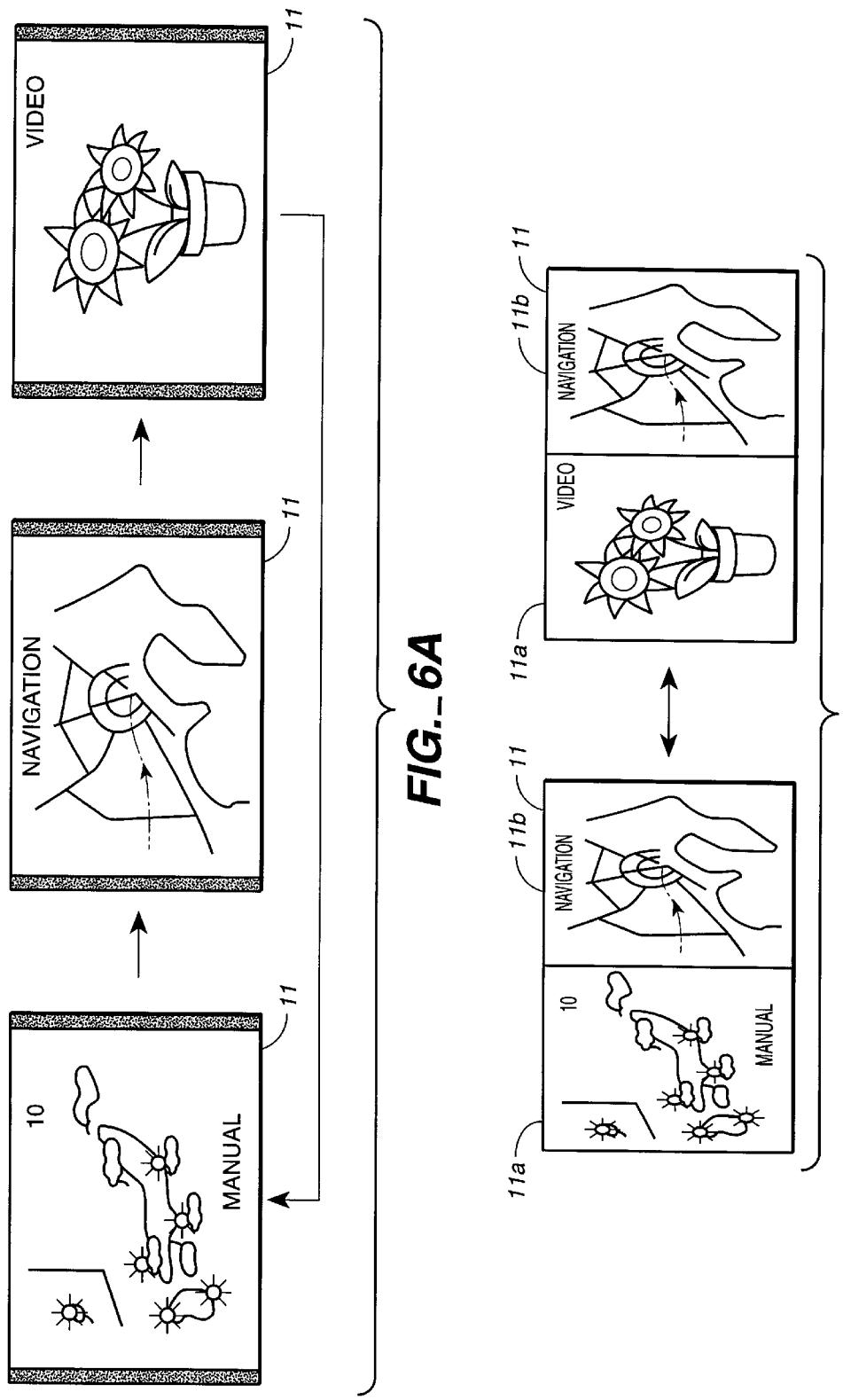

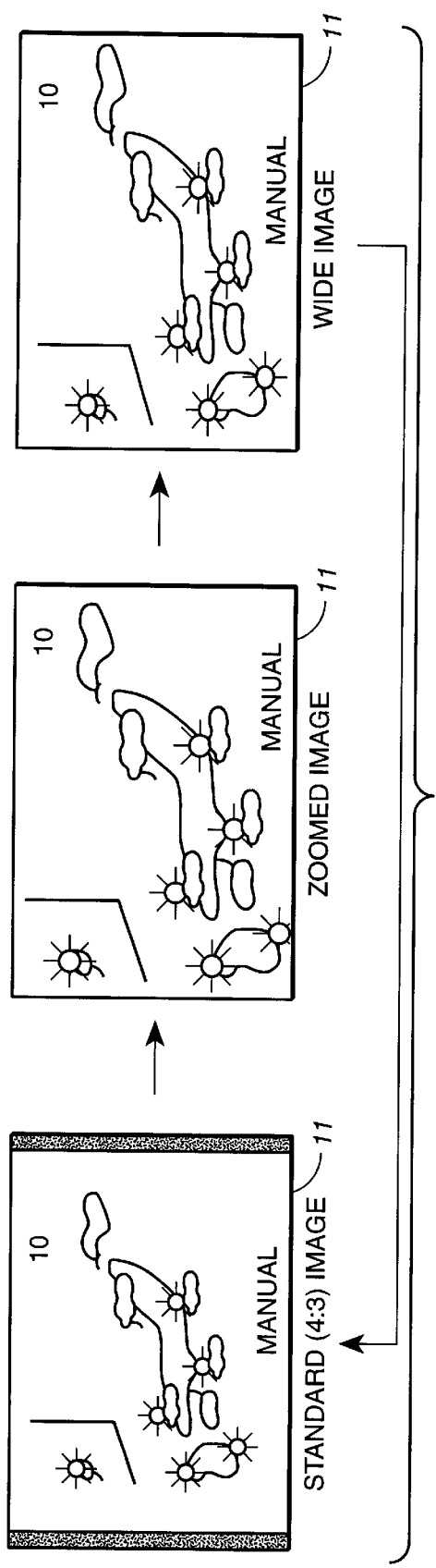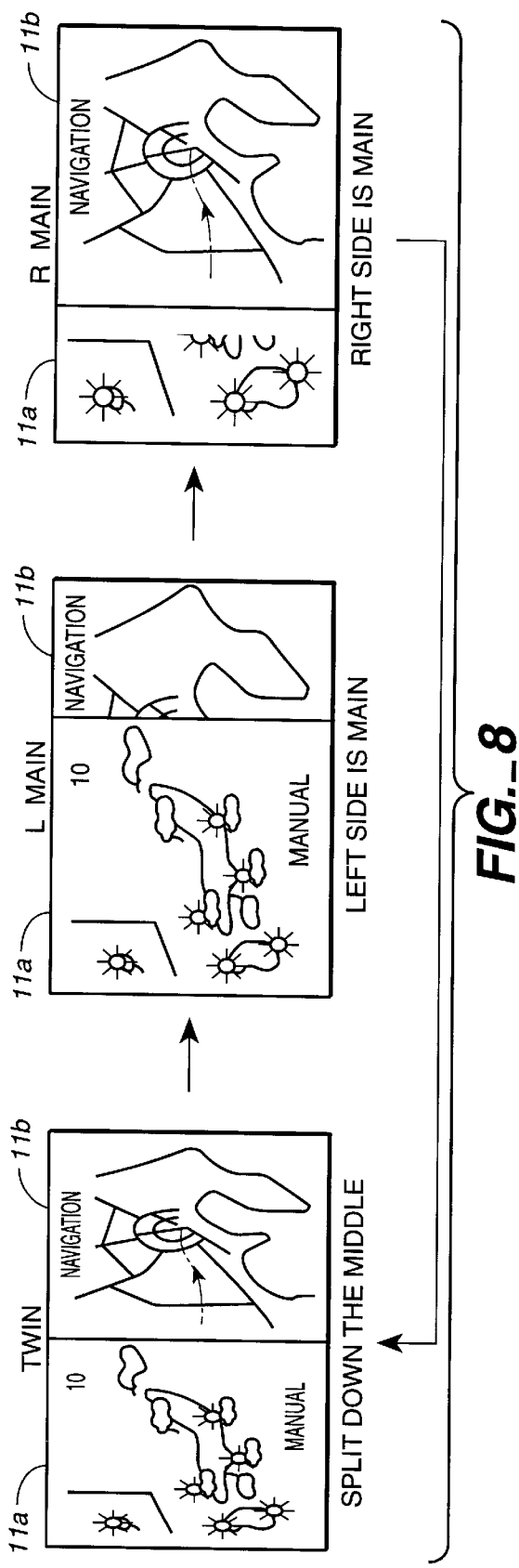
FIG._7
FIG._8

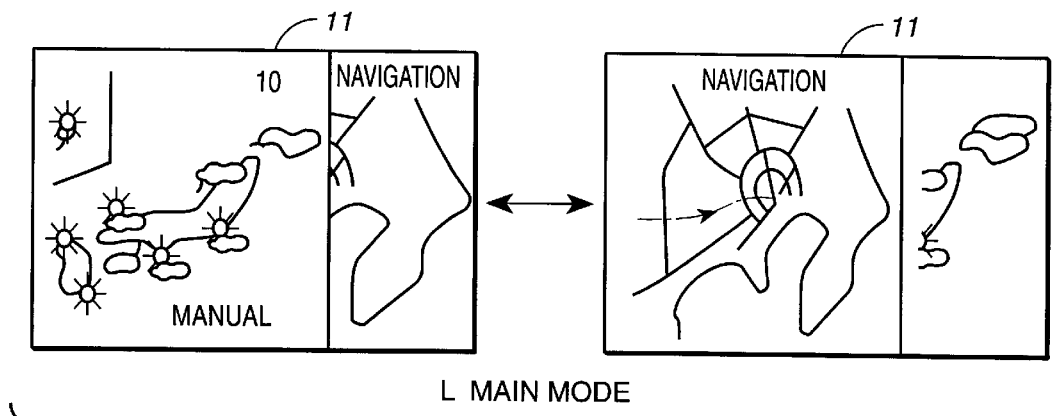
FIG._9A
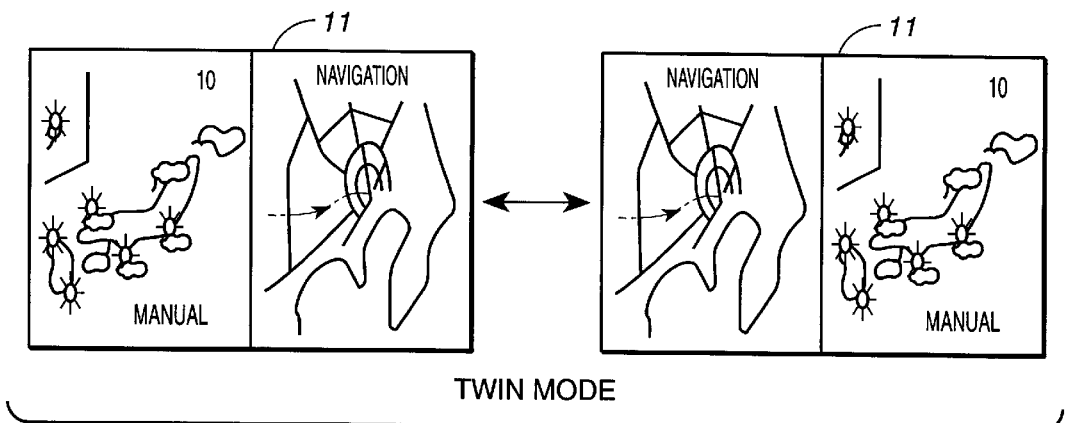
FIG._9B
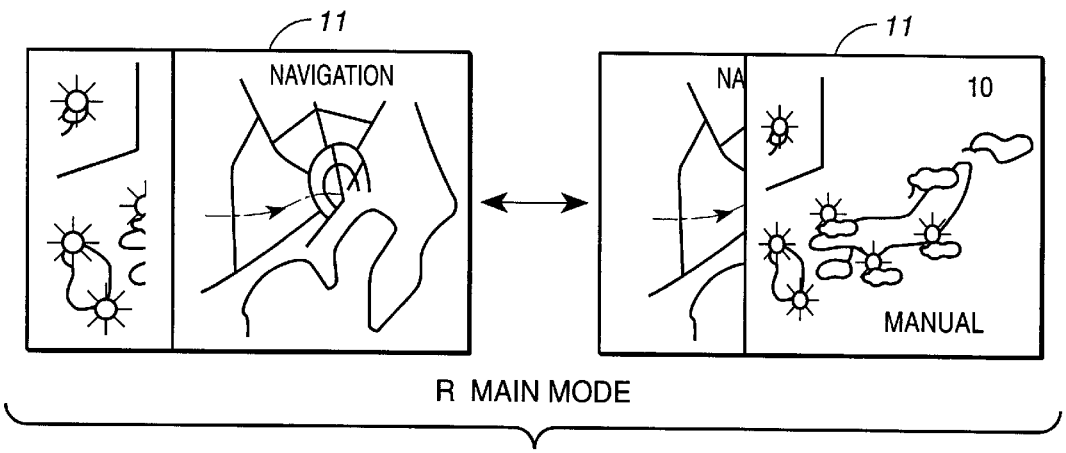
FIG._9C

AUDIO-VIDEO OUTPUT DEVICE AND CAR NAVIGATION SYSTEM

BACKGROUND OF THE INVENTION

1. Field of the Invention

The invention relates an audio-video output device and a car navigation system that can output video and audio information from a TV, a video player, or a car navigation system.

2. Description of the Related Art

Audio-video output devices, such as TV receivers, that can output images and voices are used in a wide variety of applications such as terminals for personal computers (PCs) and game computers. Furthermore, as flat and compact displays such as liquid crystal displays (LCDs) and plasma displays have become available in addition to the conventional CRTs, the applications for displays that can display video information are expanding further. Audio-video output devices equipped with a compact display such as an LCD are also being considered for embedding in cars. One of these applications is an on-board TV receiver which moves with the car and easily provides the enjoyment of TV programs in rest areas and camping sites. This receiver can also be used as the terminal of a car navigation system that indicates/displays the current position and the destination of the car to the driver using GPS (Global Positioning System) data. These audio-video output devices are also being used as the GUI (graphical user interface) terminals for controlling air conditioners and other systems.

As explained above, because audio-video output devices are equipped with the function of a terminal that provides information to users and into which information is input based on visual and audio senses, they are expected to be used in a wide variety of applications in the future, in addition to the applications described above. However, having multiple audio-video output devices for various different applications is inconvenient. For example, installing separate audio-video output devices for a TV, a car navigation system, and a video player in a small space inside a car would be a waste of space, and would also require multiple wiring and power supply facilities as well. Therefore, one idea being suggested is to provide an audio-video output device into which audio-video information for TV and audio-video information for car navigation can be input and displayed by switching the input sources, for example.

By configuring the device such that video information and audio information can be displayed by switching the input sources as explained above, a single audio-video output device can be used to output images and voices from multiple input sources. Therefore, a single audio-video output device can be used both as a TV receiver and a car navigation terminal in a car. However, since the input source must be switched for output, TV programs cannot be viewed when information such as destination and current location is being set using the device as the car navigation terminal. Conversely, even if a change occurs in the car navigation data, etc. while the device is being used as a TV, such a change cannot be communicated. As explained above, a device that displays information by switching the input source requires a small space and small hardware because a single display can display outputs from multiple input sources, and thus offers an advantage of lower overall system cost. However, such a device cannot display information from multiple input sources simultaneously. Therefore, in this respect, it would be more desirable to provide multiple audio-video output devices for the individual systems. However, providing multiple devices poses cost, hardware, and space issues as explained above.

SUMMARY OF THE INVENTION

Therefore, the object of the invention is to provide an audio-video output device that can provide the user with information from multiple input sources by means of a single display. Another object of the invention is to provide an audio-video output device that can provide the user with information from one of the multiple input sources on a real-time basis regardless of the mode in which the audio-video output device is set. Still another object of the invention is to provide a vehicle-mounted audio-video output device that can provide the user with updated information if the navigation system's information changes while the user is watching the TV, for example; and yet another object of the invention is to provide a car navigation system that can be used for multiple purposes by adopting the audio-video output device according to the invention.

Therefore, the audio-video output device according to the invention is provided with at least two audio input means, or a video output means that can display two pieces of video information by splitting the screen, wherein the audio information or video information from at least two of the multiple sources can be output. Furthermore, one of the two pieces of audio information that can be output from the two audio output means or one of the two pieces of video information that can be split and output, can be allocated to a particular source.

That is, the audio-video output device having two audio output means according to the invention is provided with a first input means into which the video information and audio information from a first source can be input; a second input means into which the video information and audio information from a second source can be input; a video output means that can output the video information from either the first or second source; a first audio output means that outputs the audio information from either the first or second source, whichever is being output to the video output means; and a second audio output means that can output only the audio information from the first source. Since the audio-video output device according to the invention is equipped with the second output means, the audio information from the first source can be output even while the video information and the audio information from the second source are being output from the audio-video output device. Consequently, the information from the first source that is converted into a voice can be constantly monitored. Moreover, providing a first audio selection means that selects either the audio information from the first or second source, whichever is being output to the video output means, and a second audio selection means that selects either the audio information selected by said first audio selection means or the audio information from the first source and supplies it to the second audio output means, allows the user to select whether or not to constantly monitor the first source.

Furthermore, if the video output means is equipped with a multi-screen display mode that displays video information from the first and second sources by splitting the display screen into multiple screens, providing a third audio selection means that selects the audio information from the source displayed in the predetermined area of the display screen and supplies it to the first audio output means and the second audio selection means, enables the selection of the input source for the audio information being supplied from the first audio output means, based on the display position of the image.

Moreover, the audio-video output device according to the invention, which can display video information from at least two sources by splitting the screen, has a first input means that can input the video information and audio information from the first source; a second input means that can input the video information from the second source; a third input means that can input the video information and audio information from the third source; a video output means that can output the video information from the first, second, or third source; and a first audio output means that outputs the audio information from the first, second, or third source, whichever is being output to the video output means; wherein the video output means is provided with a single-screen display mode which displays the first, second, or third source in the display screen and with a multi-screen display mode which splits the display screen, displays the video information from the first source in one of the split screen, and displays the video information from either the second or third source in the other split screen. Providing such a multi-screen display mode makes it possible to display the video information from the first source without fail even while the video information from the second or third source is being output, so that the information from the first source can be constantly monitored.

Furthermore, the audio-video display device according to the invention can be provided with a first video selection means that selects the video information from the first, second, or third source and supplies it to the video output means, and with a second video selection means that selects the video information from the first source in the multi-screen display mode and supplies it to the video output means as the video information for one of the split screen, so that the first video selection means can select the video information from either the second or third source in the multi-screen display mode and supplies it to the video output means as the video information for the other split screen. Consequently, it is possible to set the audio-video output device so that one of the three sources can be selected in the single-screen display mode, and the first source is always displayed in the multi-screen display mode. Of course, the same holds true for an audio-video output device that can accept inputs from four or more sources.

By using a display screen having a large vertical-to-horizontal ratio, e.g., 9:16, as the display screen of the video output means, sufficiently large images can be obtained even in the multi-screen display mode. Moreover, in the multi-screen display mode, providing a mode for splitting the screen in the middle and another mode for splitting the screen so that the vertical-to-horizontal ratio of one of the screens will be 3:4, will provide displays suitable to specific applications.

By providing the audio-video output device which can display information by splitting the screen, with a second audio output means that can output the audio information from the first source only, as in the case described above, it becomes possible to monitor the audio information from the first source in any mode. It also becomes possible to select monitoring, or to select the source to be output from the first audio output means based on the area in which the video information is being displayed. When the display screen is vertically split into at least two screens in the multi-screen display mode and the video information from the sources to be displayed on the left and right areas can be swapped, it is possible to adopt a process in which a third audio selection means selects the audio information from the source displayed in either the left or right area. For example, if the device is designed to select the audio information from the source displayed on the left area, the user can select the audio information to be output from the first audio output means by moving the position in which the video information is displayed.

Furthermore, when the audio-video output device according to the invention is used in the terminal of a car navigation system, the video information and audio information from the first source which supplies driving information can be the video information and audio information from the car navigation system while the video information and audio information from the second source can be the video information and audio information from an instrument such as a TV tuner. In a vehicle-mounted device, a thin liquid crystal display device that can be mounted in a vehicle can be used as the video output means, and a wide display device is suitable if the screen can be split for display. A device that can output voice from a car audio system via FM waves can be used as the first audio output means.

When implementing the invention as a vehicle-mounted audio-video output device, it is possible to design the device so that it automatically switches to the single-screen display mode during driving even if the dual-screen display mode is set, allowing video information from the car navigation system, i.e., the first source, to be output.

Furthermore, a car navigation system equipped with the aforementioned functions can be provided by installing the audio-video output device according to the invention and by providing this audio-video output device with a car navigation information supply device that can supply the video information and audio information for car navigation as the video information and audio information from the first source.

BRIEF DESCRIPTION OF THE DRAWINGS

FIG. 2 illustrates the back side of the monitor area of the AV monitor shown in FIG. 1;

FIG. 3 is a block diagram showing the configuration of the AV monitor shown in FIG. 1;

FIG. 4 is a flow chart showing an overview of the processing in the AV monitor shown in FIG. 1;

FIG. 5 illustrates the single-screen display mode and the dual-screen display mode;

FIG. 6 illustrates source switching;

FIG. 7 illustrates display mode switching in the single-screen display mode;

FIG. 8 illustrates display mode switching in the dual-screen display mode; and

FIG. 9 illustrates the switching of two screens.

Figure 1:
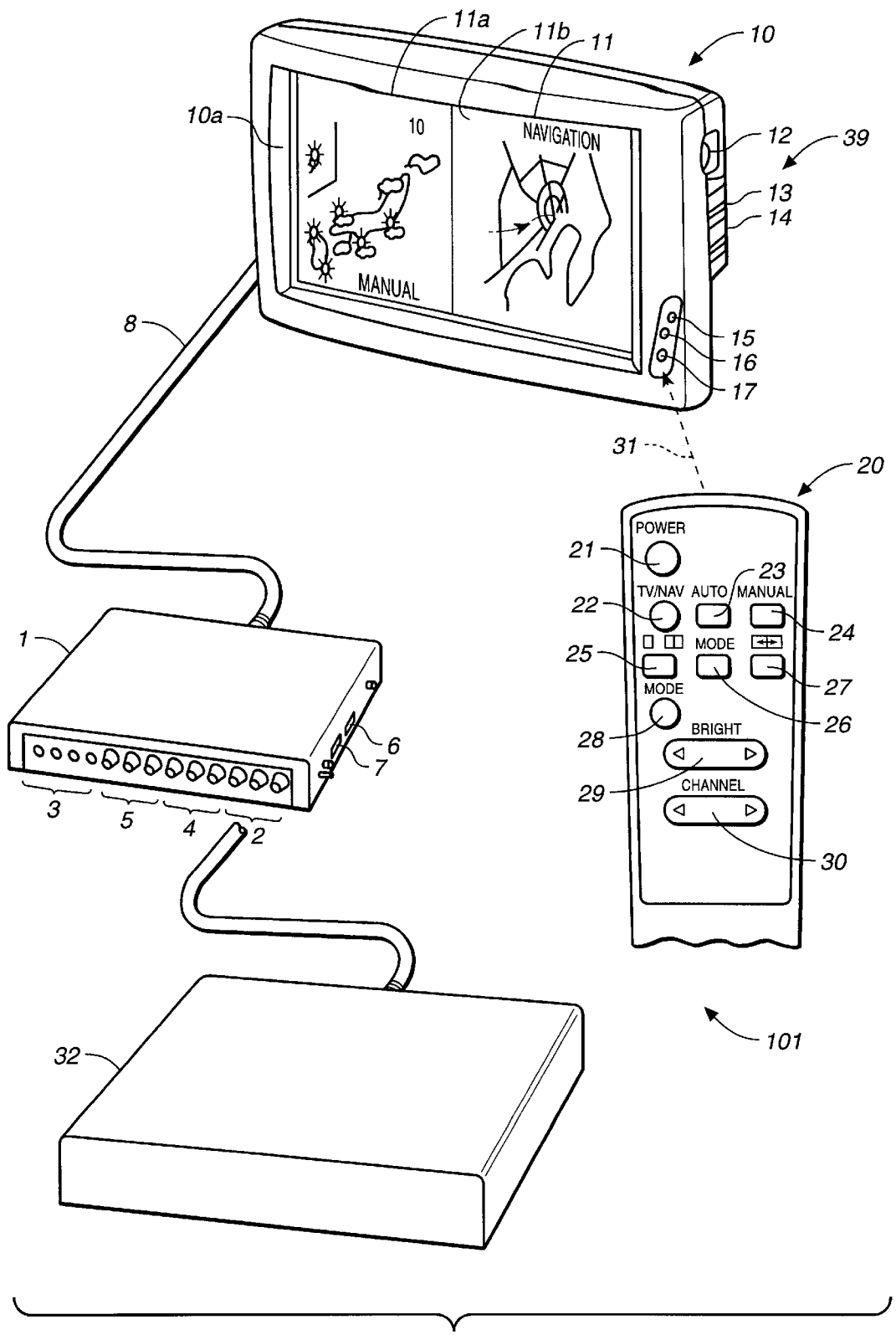
FIG. 1 is a schematic diagram of the audio-video output device (AV monitor) related to an embodiment of the invention.

The explanations of the symbols used in the drawings follow.

1 . . . Tuner
2 . . . Car navigation information input terminal
3 . . . TV antenna terminal
4 . . . Video information input terminal
5 . . . Video information input terminal
10 . . . Monitor
11 . . . LCD panel
20 . . . Remote controller
32 . . . Navigation unit
39 . . . AV monitor (audio-video output device)
40 . . . Microcomputer
42 . . . TV tuner 50 . . . AV selection area
51, 52, 53 . . . Audio information selector
55, 56 . . . Video information selector
101 . . . Car navigation system

DESCRIPTION OF THE PREFERRED EMBODIMENTS

A more detailed explanation is provided below with reference to an embodiment of the invention. FIG. 1 shows the schematic configuration of a car navigation system that uses the audio-video output device according to the invention. Audio-video output device (AV monitor) 39 in this embodiment is provided with monitor 10 which is equipped with large liquid crystal display panel 11, and with tuner 1 which can select information from multiple sources and supply it to monitor 10, and the selection of the source to be output from AV monitor 39, operations, and monitor mode setting, etc. can be performed using remote controller 20 via an infrared interface. Furthermore, car navigation unit 32, which provides car navigation information as audio and video information, is connected to AV monitor 39, thus forming car navigation system 101 of this embodiment.

Tuner 1 of AV monitor 39 is provided with car navigation input terminal 2 (first source) into which the audio and video information from car navigation unit ("NAV") 32, are provided antenna terminal 3 (second source) to which four sets of diversity antenna can be connected, video input terminal 4 (third source) into which audio and video information from a video device, etc. can be input, and video output terminal 5 which can supply audio and video signals to an externally provided TV monitor in the rear passenger compartment. As described above, although the AV monitor in this embodiment is a compact system that can be mounted in a vehicle, it is a full-fledged AV monitor with built-in multiple AV interface functions and is designed to be able to be used for a variety of applications.

Although not shown in the figure, Tuner 1 is provided with a power supply terminal for obtaining power from the car battery, and with an audio output terminal which can be connected to a transmitter antenna which is the antenna of FM transmitter circuit 44 (FIG. 3) which performs the function of a first audio output means which relays audio signals to the car audio system using FM waves (VHF waves), etc. Furthermore, audio selection switch 6 for selecting the speaker sound of monitor 10 which performs the function of the second audio output means, and volume adjustment switch 7 for adjusting the output level in accordance with the amplitude of the audio signal from the car navigation unit are provided on the side surface of tuner 1. Connection cord 8 extends from tuner 1, and the video and audio data to be output through monitor 10 can be supplied via said connection cord 8.

Monitor 10 in this embodiment uses thin liquid crystal display panel 11 which can be easily installed in a car as a video output device, and AV monitor 39 in this embodiment uses a 7-inch wide monitor with a 9:16 vertical-to-horizontal ratio instead of a conventional liquid crystal panel with a 3:4 vertical-to-horizontal ratio. Although details will be explained below, the use of the wide monitor allows AV monitor 39 in this embodiment to implement both the single-screen display mode and the dual-screen display mode in which the screen can be vertically split to display screens 11a and 11b. Furthermore, multiple display modes (i.e., the Normal mode, the Zoom mode, and the Wide mode) are provided in the single-screen display mode, and various modes (i.e., the Twin mode, the L Main mode, and the R Main mode) are provided in the dual-screen display mode.

Monitor 10 of this embodiment is also provided with the function of a user interface for receiving control signals from the remote controller; and for this reason, remote controller light receiving area 17 is installed adjacent to liquid crystal panel 11 on surface 10a of monitor 10. Audio volume controller 12 for adjusting the volume of the speaker in monitor 10, selection switch 13 for selecting a backlight mode (Auto or High (high intensity)) for the liquid crystal display panel and main power supply switch 14 are also provided. Power supply lamp 15 and dimmer light receiving area 16 are also positioned adjacent to remote controller light receiving area 17, making it possible to automatically adjust screen (liquid crystal monitor) 11 according to the brightness inside the car so that it is easier to view.

FIG. 2 provides an overview of back side 10b of monitor 10 of this embodiment. Back side 10b of monitor 10 is provided with terminal 9 for connecting connection cord 8 from tuner 1 and speaker 19 which performs the function of the aforementioned second audio output means. Stand installation hardware 18 for mounting monitor 10 inside a car is also provided.

All detailed operations of AV monitor 39 in this embodiment can be performed using remote controller 20. Power supply key 21 is located toward the top of remote controller 20; and if power supply switch 14 of monitor 10 is in the standby mode, pressing power supply key 21 of remote controller 20 turns the power on, changing main power supply lamp 15 from red to green and starting the operation of AV monitor 39. TV/NAV key 22 is provided below power supply key 21, which can be used to switch the input source to be displayed on monitor 10 in successive order. In this embodiment, pressing TV/NAV key 22 switches the input source in successive order from TV, to the car navigation unit, and to the video system.

Adjacent to TV/NAV key 22, auto-presetting switch 23 for automatically searching for television (TV) channels and storing all channels that can be received and switch 24 to be used by the user for manually selecting a channel are provided. This configuration allows the user to store the appropriate channels out of the TV channels that can be received, and the video and audio information from the selected channel is processed as video and audio information from the TV input (second source) as will be explained below.

Several screen control switches are provided below these aforementioned switches. The first of these is single/dual-screen selection switch 25, and pressing this switch toggles liquid crystal display panel 11 between the single- and dual-screen display modes. Mode selection key 26, located next to single/dual-screen selection switch 25, can be used to select a display mode further within the single- and dual-screen display modes. Although details will be explained below, pressing mode selection key 26 in the single-screen display mode switches the mode in successive order from Normal (images with 3:4 vertical-to-horizontal ratio), to Zoom (overall magnification while maintaining the 3:4 vertical-to-horizontal ratio), and to Wide (images with 9:16 vertical-to-horizontal ratio). In the dual-screen display mode, pressing mode selection key 26 switches the mode in successive order from the Twin mode which evenly splits screen 11, to the L Main mode which splits the screen so that left-side screen 11a has images with 3:4 vertical-to-horizontal ratio, and to the R Main mode which splits the screen so that right-side screen 11b has images with 3:4 vertical-to-horizontal ratio. Furthermore, left-right swapping key 27 is positioned next to mode selection switch 26; and pressing this key 27 in the dual-screen display mode swaps the sources to be displayed in left and right screens 11a and 11b.

Mode adjustment key 28 is located below these other keys, which can be used in the single-screen display mode to fine-tune the screen and images from each source. Pressing mode adjustment key 28 switches the adjustment mode in successive order from brightness, shade, tone, frequency of the FM broadcasting for transmitting audio information, and to setting of sound multiplex mode for TV; and in each of these modes, brightness adjustment key 29 located on the lower side can be used to make the most appropriate setting. The setting result is stored separately for each source, and display and audio output are made in the state most suitable to the user based on the set information in the dual-screen display mode as well.

Channel selection switch 30 is located toward the very bottom of remote controller 20, which can be used to switch TV channel sources. These key operations are output from the remote controller light emitting area 31 on the top of remote controller 20 as infrared data which is then intercepted by light receiving window 17 of monitor 10. The data is then relayed to the microcomputer provided in tuner 1 via connection cord 8, where the instruction is analyzed and processing appropriate to each mode takes place.

FIG. 3 illustrates the configuration of AV monitor 39 in this embodiment using a block diagram. AV monitor 39 in this embodiment is controlled by microcomputer 40 which receives control signal $\phi 1$ from remote controller 20 via light receiving window 17. First, video information 2a and audio information 2b from car navigation unit 32, which are input into NAV input terminal 2, are supplied to AV selection area 50 which selects information from various sources including other sources. In AV monitor 39 in this embodiment, TV broadcasting (TV) information obtained via the antenna and video information entered from video terminal 4 are provided as information supplied from other sources.

Tuner 1 of AV monitor 39 in this embodiment is also equipped with the function of a TV tuner. Four antennas 33 can be connected to antenna terminal 3 of tuner 1 in this embodiment, and diversity selector 41 automatically selects from these antennas one that has the strongest signal. TV input signal from diversity selector 41 is selected by TV tuner 42, and the video information and audio information from the specified channel are selected. TV tuner 42 in this embodiment is controlled by microcomputer 40 which receives instructions from remote controller 20, and for this purpose, signal $\phi 2$ for selecting a station is supplied from microcomputer 40 to TV tuner 42. Video information selected by TV tuner 42 is amplified via intermediate frequency amplification (IF) circuit 43 and is then supplied to AV selection area 50 as TV input video information 3a. Likewise, audio information selected by TV tuner 42 is supplied to AV selection area 50 as audio information 3b of the TV input.

Signals other from a video instrument, such as a home video player, and signals (signals other than those from the car navigation system) can be connected to video input terminal 4, and video information 4a and audio information 4b from the instrument connected to said terminal 4 are supplied to AV selection area 50.

AV selection area 50 in this embodiment is mainly equipped with five selectors; 51, 52, 53, 56, and 55. Selectors 55 and 56 are used for selecting video information. In AV selection area 50 in this embodiment, input-side selector 55 is equipped with the function of the aforementioned first video selection means, so that video information from one of the three sources (NAV 2a, TV 3a, and video 4a) can be selected based on 2-bit selection signal $\phi 5$ supplied from microcomputer 40. Therefore, in the single-screen display mode, selection signal $\phi 5$ corresponding to NAV 2a, TV 3a, or video 4a is supplied from microcomputer 40; and in the dual-screen display mode, selection signal $\phi 5$ corresponding to either TV 3a or video 4a is supplied. The output from this input-side selector 55 is supplied to selector 56. The output from input-side selector 55 also becomes video information 5a for video output and is supplied to video output terminal 5. Therefore, if rear compartment monitor 35 is connected to video output terminal 5, information from NAV 2a, TV 3a, or video 4a, whichever is selected by selector 55, can be monitored in the rear passenger compartment.

Output-side selector 56 is equipped with the function of the aforementioned second video selection means, and the output selected by input-side selector 55 and video information 2a from the car navigation unit are input into this selector 56. Selector 56 is also controlled by selection signal $\phi 6$ from microcomputer 40; and in the single-screen display mode, the video information from the source selected by input-side selector 55 is output as first video signal $\phi V2$. In the dual-screen display mode, video information 2a from the NAV is output as first video signal $\phi V1$ and the video information from the source selected by input-side selector 55 is output as second video signal $\phi V2$. Consequently, in the dual-screen display mode, video information 2a from the car navigation unit is always selected as the video information for one of the screens and is always displayed on the left or right area of screen 11. Therefore, the video information from NAV can be constantly monitored along with the video information from another source.

First and second video signals $\phi V1$ and $\phi V2$ which are output from AV selection area 50 are supplied to monitor 10 via connection cord 8, demodulated into R, G, and B color video signals by first and second chrominance demodulators 61 and 62, and are then supplied to controller IC 63 for video synthesis. Controller IC 63 and field memory 64 together form the video synthesis circuit, which can synthesize the information in first and second video signals $\phi V1$ and $\phi V2$ into images in the various modes described below, according to serial signal $\phi 8$ from microcomputer 40, and can supply these images to liquid crystal display module 70. Liquid crystal display module 70 is provided with liquid crystal driver 71 equipped with the aforementioned wide liquid crystal panel 11, a driver IC for driving wide liquid crystal panel 11, and a controller IC for controlling the driver IC; and with BL driver 72 for driving the backlight. BL driver 72 in this embodiment is equipped with the function for automatically adjusting the brightness of the backlight according to the intensity of the ambient light detected by the dimmer light receiving area as explained above.

The audio information selection function of AV selection area 50 of tuner 1 is explained below. AV selection area 50 in this embodiment is also equipped with an audio information selection function. Selectors 51, 52, and 53 of AV selection area 50 in this embodiment are the selectors used for selecting audio information. Input-side selector 51 is equipped with the function of the aforementioned first audio selection means, and this selector 51 selects audio information from one of the three sources (NAV 2b, TV 3b, and video 4b). The same 2-bit selection signal $\phi 5$ as that supplied to video-side selector 55 is supplied to input-side selector 51 from microcomputer 40, so that one of the audio signals 2b, 3b, and 4b that are input into selector 51 from the three sources can be selected. The output from this input-side selector 51 becomes the input for the next-stage selector 53, and at the same time the audio information selected by this selector 51 becomes audio output 5b of video output terminal 5 and can be supplied, along with the aforementioned video output 5a, to external monitor 35 such as a monitor in the rear passenger compartment.

Selector 53 in the next stage is equipped with the function for selecting audio information from the same source as that displayed in the specified location in the dual-screen display mode, and is equipped with the function of the aforementioned third audio selection means. AV monitor 39 of this embodiment is designed to select the audio information from the source of the image being displayed on left side 11a of display panel 11. For this reason, audio information 2b from NAV which is always displayed on one of the split screens and the audio information selected by input-side selector 51 are input into selector 53, and the audio information for the source displayed on the left side of the screen is selected based on selection signal φ7 from microcomputer 40. Then, the audio information selected by this selector 53 becomes one of the input sources for the next output-side selector 52, is at the same time frequency-modulated through FM transmitter circuit 44 equipped with the function of the aforementioned first audio output means, and is connected to FM output terminal 37. Transmitter antenna 34 can be connected to this FM output terminal 37 so that the audio information selected by selector 53 can be played inside the car using the car audio system. The desired frequency can be selected in FM transmitter circuit 44 of this embodiment, and control signal φ3 from microcomputer 40 is supplied to FM transmitter circuit 44 to enable presetting of that frequency.

Audio information 2b from NAV and the audio information corresponding to the image selected by third selector 53 are input into output-side selector 52, so that and one of these can be output. Therefore, if selector 52 is equipped with the function of the aforementioned second audio selection means and if audio information 2b from NAV is selected, audio information 2b from NAV is output from selector 52 regardless of the image being displayed and is supplied to monitor 10 via connection cord 8. In monitor 10, the output of selector 52 is amplified by audio amplifier 75 and is output from speaker 19 on the back side. In AV monitor 39 of this embodiment, selection switch 6 is provided on the side surface of tuner 1 so that the user can select the audio information to be output from speaker 19 of monitor 10. Therefore, if the output of selector 53 is selected based on selection signal φ9 from selection switch 6, the audio information that corresponds to the image being displayed on display panel 11 is output from speaker 19 of monitor 10. On the other hand, if audio information 2b from NAV is selected by selection switch 6, audio information 2b supplied from NAV system 32 is output regardless of the image being displayed on display panel 11, enabling constant monitoring of the state of NAV.

AV monitor 39 of this embodiment is further provided with power supply terminal 38 which can be connected to the cigarette lighter socket inside the car for obtaining power, so that power can be supplied to various systems, such as tuner 1 and monitor 10, via power supply unit 45. Driving monitor terminal 36 is also provided which can be connected to the hand brake (parking brake); and signal φ4 that is input from this monitor terminal 36 is used to determine whether or not the parking brake is set, so that microcomputer 40 can determine whether or not the car is being driven.

The operations related to display and source switching of AV monitor 39 in this embodiment will be explained based on the flow chart shown in FIG. 4. First, in Step 81, pressing single/dual-screen selection switch 25 of remote controller 20 toggles between the single-screen display mode which displays a single screen on panel 11 and the dual-screen display mode which displays two screens by splitting panel 11, as shown in FIG. 5. Since AV monitor 39 of this embodiment can monitor whether or not the car is being driven, when single/dual-screen selection switch 25 is pressed in Step 81, whether or not the car is being driven is determined in Step 82. If the car is not being driven, the panel 11 is alternated between the single-screen display mode and the dual-screen display mode (Step 83), as shown in FIG. 5. On the other hand, if the car is being driven, the panel 11 is set to the single-screen display mode in Step 84 and enters the NAV priority mode described below, and thus video information 2a from NAV is always displayed. In the dual-screen display mode, video information 2a from NAV is always displayed on one of the screens as shown in FIG. 5, so that the information from NAV can be constantly monitored along with TV images and video images. The display position and size of video information 2a from NAV can be freely changed as explained below.

Next, in Step 85, pressing TV/NAV source switching key 22 changes the source to be displayed on the screen in turn. Following Step 85, whether the screen mode is the single-screen display mode or dual-screen display mode is determined in Step 86. If the screen mode is the single-screen display mode, the screen changes in successive order from television (TV) 3a, to car navigation unit (NAV) 2a, and to video (AV) 4a, as shown in FIG. 6 (a). The audio information to be supplied from the car audio system is also switched according to the source displayed on the screen. Note however that the audio information to be output from speaker 19 of monitor 10 can be selected using selection switch 6 as explained above. Therefore, if NAV has been selected, audio information 2b from NAV can be constantly supplied from speaker 19 of monitor 10 even when source switching switch 22 is pressed to switch the display source, so that the announcements from the car navigation system can be constantly monitored. The initial value for AV monitor 39 of this embodiment selects NAV in the single-screen display mode, so that information from NAV 32 is displayed when AV monitor 39 is turned on.

If the screen mode is determined to be the dual-screen display mode in Step 86, pressing source switching switch 22 toggles one of the screens between TV 3a and AV 4a in Step 88 as shown in FIG. 6 (b). Meanwhile, information from NAV is displayed on the other screen. In the dual-screen display mode, the audio information from the source of the video information being displayed on the left-side screen is supplied via the car audio system. However, even in this state, AV monitor 39 in this embodiment allows audio information 2b from NAV to be constantly monitored using selection switch 6 as explained above.

With AV monitor 39 in this embodiment, more varied display switching can be performed by operating mode switch 26 of the remote controller. First, when pressing of mode switch 26 is detected in Step 89, screen mode is checked in Step 90. If the screen mode is determined to be the single-screen display mode, the display mode for the screen is switched to NormaL Zoom, or Wide in Step 91. This kind of display mode switching is possible since AV monitor 39 in this embodiment uses wide liquid crystal display panel 11. In the Normal mode, a conventional screen with a 3:4 vertical-to-horizontal ratio is used for display as shown in FIG. 7. In the Zoom mode, the horizontal dimension is expanded to equal the size of display panel 11 while maintaining the 3:4 vertical-to-horizontal ratio. Consequently, the top and bottom of the display is cut off. In the Wide mode, an image that is expanded in the horizontal direction to match the 9:16 vertical-to-horizontal ratio of wide display panel 11 is displayed. Of course, these display modes are available when TV 3a is selected as well as when NAV 2a or video 4a is selected.

On the other hand, if the screen mode is determined to be the dual-screen display mode in Step 90, the display mode for the screen is switched to Twin, L Main, and R Main in Step 92 every time mode switch 6 is pressed, as shown in FIG. 8. The initial value of the AV monitor 39 in this embodiment is set to the Twin mode. In this mode, screen 11 is split in the middle and video information from two sources is displayed in equal sizes, i.e., with a 9:8 vertical-to-horizontal ratio with slight horizontal compression. In the L Main mode, left side 11a of screen 11 becomes the main screen. In this mode, a conventional image with a 3:4 vertical-to-horizontal ratio is displayed on left-side screen 11a, and right-side screen 11b is displayed in the remaining area. On the other hand, in the R Main mode, right side 11b of screen 11 becomes the main screen. In this mode, a conventional image with a 3:4 vertical-to-horizontal ratio is displayed on right-side screen 11b, and left-side screen 11a is displayed in the remaining area. Since the dual-screen display mode always displays image 2a from NAV in one of the screens as explained above, such a mode setting allows the user to choose to view video information 2a from NAV as the main information or to view the information from TV or other video information as the main information. The user can also freely set the position in which to display such information.

Furthermore, in the dual-screen display mode, AV monitor 39 in this embodiment allows the user to freely swap the images being displayed on the left and right sides. All that is needed is to press left-right swapping key 27 of remote controller 20. When pressing of swapping key 27 is confirmed in Step 93, screen mode is checked in Step 94; and if the screen mode is the dual-screen display mode, the two screens are swapped in Step 95. On the other hand, if the screen mode is determined to be the single-screen display mode, no screen operation takes place and the process moves onto checking the next switch operation. The screens can be swapped from any state as long as the screen is in the dual-screen display mode. For example, if the L Main mode is in effect as shown in FIG. 9 (a), the main video information on the left side and the sub video information on the right side are immediately swapped. If the Twin mode is in effect as shown in FIG. 9 (b), the video information on the left side and the right side are swapped. If the R Main mode is in effect as shown in FIG. 9 (c), the main video information on the right side and the sub video information on the left side are swapped. When AV monitor 39 in this embodiment is in the dual-screen display mode, the audio information for the image being displayed on left side 11a of display panel 11 is supplied from the car audio system. Therefore, when the left and right video information is swapped by screen swapping switch 27, audio information is also automatically swapped. In other words, the audio information can be swapped by manipulating the video information. Since the user can automatically manipulate the audio information by manipulating the images, the desired audio information can be quickly obtained using a simple operation. Even when screens are swapped in this way, audio information 2a from NAV can be continuously monitored through speaker 19 of monitor 10 as described above, and thus the user will not miss any of audio information 2b from the car navigation system.

Since AV monitor 39 in this embodiment is also equipped with mode adjustment switch 28, its operation is checked in Step 96; and if the screen mode is determined to be the single-screen display mode in Step 97, a series of adjustments are made in Step 98. On the other hand, no adjustments are made in the dual-screen display mode and the process moves onto checking another switch. AV monitor 39 in this embodiment can also determine whether or not the car is being driven based on the hand brake (parking brake) position, etc. in Step 99; and shifts to the NAV priority mode in Step 100 if it is determined that the car is being driven; and video information 2a and audio information 2b from NAV are automatically selected as the input sources in the single-screen display mode. This selection can be made by output-side selectors 56 and 52 of AV selection area 50 into which video information 2a and audio information 2b from NAV are being directly input. Therefore, even while the car is being driven, input-side selectors 55 and 51 can select information from various sources (i.e., NAV, TV, or AV), and this information can be output from video output terminal 5 to a monitor in the rear passenger compartment so that the passengers there can enjoy TV and video programs.

In AV monitor 39 of this embodiment, mode selection and other processing can be performed by repeatedly sampling the operation states of the aforementioned various operation switches. The video display mode and the audio output mode that have been set are stored without any modifications, so that the system can be set to these stored modes when power is turned on subsequently, unless it is returned to the initial setting mode.

As explained above, AV monitor (audio-video output device) 39 in this embodiment allows the user to enjoy video information from a TV or video player while constantly monitoring the video and audio information from the car navigation system which supplies information necessary for driving. Therefore, AV monitor 39 in this embodiment allows the user to perform operations, such as setting the car navigation system and monitoring the distance and time driven, while watching TV or video, all on a single display. AV monitor 39 in this embodiment is equipped with the function of an inexpensive and easy-to-install terminal that can simultaneously output video and audio information from multiple sources; and is also equipped with the function of constantly monitoring the video or audio information by treating one of these sources as the main source. Therefore, the AV monitor in this embodiment can be used in a wide variety of applications, such as terminals for car navigation systems that must be constantly monitored, positional display monitors in ships, and disaster information monitors. Furthermore, since the AV system in this embodiment allows the user to constantly monitor information from a single source while enjoying information from multiple sources on a single display, a system that reliably supplies a particular type of information to the user while supplying many types of information can be inexpensively constructed.

Although a monitor equipped with three types of input sources (TV, NAV, and video player) is used for the explanation above, a monitor equipped with four or more input sources can of course be used; and the screen can also be split into any number in addition to two. Although an embodiment equipped with hardware that can constantly display the images and information from NAV is explained in the AV monitor of this embodiment, a system that allows the user to select the main source to be constantly displayed is also possible. Furthermore, in this embodiment, everything except audio information output setting in the monitor area can be controlled by the microcomputer. However, it is also possible to use the microcomputer to select audio information in the monitor area, and conversely it is also possible to use selection switches for all settings. While the device in this embodiment uses a liquid crystal display panel, other thin display panels, such as a plasma display, can also be used. VICS™ (Vehicle Information and Communication System) information, though not containing any audio information, can also be displayed as car navigation information. However, since no audio information is available in this case, no sound is output from the speaker of the AV monitor in some cases.

As explained above, by installing multiple audio output means or a video output means that can split the screen for display, the invention can provide an audio-video output device that can provide the user with information from multiple input sources using a single display. Furthermore, by allocating one of the multiple audio output means to a specific input source, the audio information from that particular source can be provided to the user on a real-time basis regardless of the mode to which the audio-video output device is set. Moreover, by allocating one of the multiple sources that can be displayed to a specific input source, the video information from that particular source can be constantly displayed. Therefore, the audio-video output device according to the invention can be used to inexpensively construct a system that can simultaneously output video and audio information from multiple sources, and which can reliably obtain particular information without fail.

Furthermore, the use of the audio-video output device according to the invention in a car navigation system can provide a car navigation system that can respond to the user's various needs as explained above.

What is claimed is:

1. An audio-video output device comprising:

a first input terminal for receiving video information and audio information from a first source;

a second input terminal for receiving video information and audio information from a second source;

a video output for outputting video information from at least one of said first and second sources;

a first audio output comprising an FM transmitter for outputting audio information from one of said first and second sources being output by said video output; and a second audio output for outputting audio information from another of said first and second source.

2. An audio-video output device according to claim 1, further comprising:

a first audio selector for selecting audio information from said one of said first and second sources being output by said video output, and a second audio selector for selecting one of audio information selected by said first audio selector and audio information from said first source and for supplying said selected one audio information to said second audio output.

3. An audio-video output device according to claim 2 wherein said video output comprises a multi-screen display for displaying video information from said first and second sources, and further comprising a third audio selector for selecting audio information from one of said first and second sources being displayed in a predetermined area of said multi-screen display, and for supplying said selected audio information to said first audio output and said second audio selector.

4. An audio-video output device according to claim 1, wherein said first source comprises a car navigation system, said video output comprises a liquid crystal display device, and said second audio output comprises a speaker mounted near said liquid crystal display device.

5. An audio-video output device comprising:

a first input terminal for receiving video information and audio information from a first source;

a second input terminal for receiving video information and audio information from a second source;

a third input terminal for receiving video information and audio information from a third source;

a video output for outputting video information from at least one of said first, second and third sources;

a first audio output for outputting audio information from one said first, second and third sources being output by said video output; and a second audio output for outputting audio information exclusively from said first source wherein said video output comprises a display for displaying, in a single-screen display mode, video information from one of said first, second and third sources, and, in a multi-screen display mode, for displaying video information from said first source on a first portion of said display, and for displaying video information from at least one of said second and third sources on a second portion of said display.

6. An audio-video output device according to claim 5, further comprising a first video selector for selecting video information from at least one of said first, second and third sources and for supplying said selected video information to said video output; and a second video selector for selecting video information from said first source in said multi-screen display mode and to for supplying said video information to said video output, and wherein said first video selector selects video information from one of said second and third sources in said multi-screen display mode to supply said video information to said video output.

7. An audio-video output device according to claim 5 wherein said display comprises a display screen having a 9:16 vertical-to-horizontal ratio, and operable in one mode wherein said display screen is split in the middle and another mode wherein said display screen is split such that the vertical-to-horizontal ratio of one portion of the display screen is 3:4.

8. An audio-video output device according to claim 5, comprising a first audio selector for selecting audio information from said one of said first, second and third sources being output by said video output, and a second audio selector for selecting one of audio information selected by said first audio selector and audio information from said first source and for supplying said selected one audio information to said second audio output.

9. An audio-video output device according to claim 8, further comprising a third audio selector for selecting audio information from a source being displayed in a predetermined area of said display, and for supplying said audio information to said first audio output and said second audio selector in said multi-screen display mode.

10. An audio-video output device according to claim 9 wherein said second audio output comprises a speaker mounted near said video output.

11. An audio-video output device according to claim 9, wherein in said multi-screen display mode, said display is split into at least said first and second portions for display, and further comprising a controller for swapping video information from sources displayed on said first and second portions, and wherein said third audio selector selects audio information from a source being displayed in one of said first and second portions.

12. An audio-video output device according to claim 5, wherein said first source comprises a car navigation system, said second source comprises a TV tuner, said video output comprises a liquid crystal display device, and wherein said first audio output comprises an FM transmitter.

13. An audio-video output device according to claim 1, further comprising a car navigation information supply device for supplying video information and audio information for car navigation and wherein said first source comprises said car navigation information supply device.

14. An audio-video output device according to claim 2, wherein said first source comprises a car navigation system, said video output comprises a liquid crystal display device, said first audio output comprises an FM transmitter, and said second audio output comprises a speaker mounted near said liquid crystal display device.

15. An audio-video output device according to claim 3, wherein said first source comprises a car navigation system, said video output comprises a liquid crystal display device, said first audio output comprises an FM transmitter, and said second audio output comprises a speaker mounted near said liquid crystal display device.

16. An audio-video output device according to claim 5, wherein said first source comprises a car navigation system, said second source comprises a TV tuner, said video output comprises a liquid crystal display device, and wherein said first audio output comprises an FM tuner.

17. An audio-video output device according to claim 5, further comprising a car navigation information supply device for supplying video information and audio information for car navigation and wherein said first source comprises said car navigation information supply device.

18. An audio-video output device according to claim 5, further comprising a car navigation information supply device for supplying video information and audio information for car navigation and wherein said first source comprises said car navigation information supply device.

19. An audio-video output device according to claim 8, further comprising a car navigation information supply device for supplying video information and audio information for car navigation and wherein said first source comprises said car navigation information supply device.

20. An audio-video output device comprising:

a video connection terminal;

an audio connection terminal;

a first input terminal for receiving a first video signal and a first audio signal from a first source, said first input terminal having a first video line for carrying said first video signal and having a first audio line for carrying said first audio signal;

a second input terminal for receiving a second video signal and a second audio signal from a second source, said second input terminal having a second video line for carrying said second video signal and having a second audio line for carrying said second audio signal;

a first video selector having a first input node electrically coupled to said first video line and having a second input node electrically coupled to said second video line, said first video selector having an intermediate video output node and being effective for selectively coupling of one of its first and second input nodes to its intermediate video output node;

a second video selector having a first input node electrically coupled to said first video line via a third video line bypassing said first video selector and having a second input node electrically coupled to said intermediate video output node of said first video selector, said second video selector selectively applying at least one of its first and second input nodes to said video connection terminal;

a first audio selector having a first input node electrically coupled to said first audio line and having a second input node electrically coupled to said second audio line, said first audio selector having an intermediate audio output node and selectively coupling of one of its first and second input nodes to its intermediate audio output node; and a second audio selector having a first input node electrically coupled to said first audio line via a third audio line bypassing the first audio selector and having a second input node electrically coupled to said intermediate audio output node of said first audio selector, said second audio selector selectively coupling one of its first and second input nodes to said audio connection terminal.

21. The audio-video output device of claim 20 wherein said second video selector is further effective for establishing a dual-screen mode in which said second video selector applies a split screen image to said video connection terminal, said split screen image including the image of said first video line in one screen and the image of said intermediate video output node in a second screen.

22. The audio-video output device of claim 20 wherein said second video selector includes a first image output node coupled to said video connection terminal and a second image output node coupled to said video connection terminal, said second video selector being effective for selectively coupling its second input node to either of said first and second image output nodes, and effective for selectively coupling its first input node to only said second image output node;

said second video selector establishing a dual-screen mode by coupling its first input node to its second image output node and coupling its second input node to its first image output node.

23. The audio-video output device of claim 21, wherein said first source comprises a car navigation system for use in a car having at least a park operation mode and a drive operation mode, said second video selector being effective for establishing said dual-screen mode in response to said drive operation mode.

24. The audio-video output device of claim 20, wherein said first source comprises a car navigation system for use in a car having at least a park operation mode and a drive operation mode, said second video selector being effective for applying its first input node to said video connection terminal in response to said car being in said drive operation mode.

25. The audio-video output device of claim 23 wherein said park and drive operation modes are respectively determined by the engaging and disengaging of a parking brake in said car.

26. The audio-video output device of claim 20 further having a third audio selector having a first input node electrically coupled to said first audio line via a fourth audio line bypassing said first and second audio selector and having a second input node electrically coupled to the audio output of said second audio selector, said third audio selector selectively coupling said first audio line to said audio connection terminal in response to a manual override switch.

27. The audio-video output device of claim 26 wherein the audio output of said second audio selector is further coupled to an FM transmitter.

28. The audio-video output device of claim 20, further comprising:
 a video display electrically coupled to said video connection terminal, and
 a speaker electrically coupled to said audio connection terminal.

29. The audio-video output device of claim 20, further comprising:
 a video output terminal electrically coupled to said intermediate video output of said first video selector, and
 an audio output terminal electrically coupled to said intermediate audio output node of said first audio selector.

* * * * *